United States Patent
Kurtz et al.

(10) Patent No.: US 7,484,415 B2
(45) Date of Patent: Feb. 3, 2009

(54) PRESSURE TRANSDUCER EMPLOYING A MICRO-FILTER AND EMULATING AN INFINITE TUBE PRESSURE TRANSDUCER

(75) Inventors: Anthony D. Kurtz, Saddle River, NJ (US); Tonghuo Shang, East Lyme, CT (US); Adam M. Hurst, State Hill, NY (US)

(73) Assignee: Kulite Semiconductor Products, Inc., Leonia, NJ (US)

( * ) Notice: Subject to any disclaimer, the term of this patent is extended or adjusted under 35 U.S.C. 154(b) by 461 days.

(21) Appl. No.: 11/409,139

(22) Filed: Apr. 21, 2006

(65) Prior Publication Data

US 2008/0276712 A1 Nov. 13, 2008

(51) Int. Cl.
 *G01L 9/00* (2006.01)
(52) U.S. Cl. .......................... 73/716; 73/756
(58) Field of Classification Search .................. 73/716, 73/756
 See application file for complete search history.

(56) References Cited

U.S. PATENT DOCUMENTS

| | | | | |
|---|---|---|---|---|
| 4,994,781 A | * | 2/1991 | Sahagen | ...................... 338/47 |
| 5,587,601 A | * | 12/1996 | Kurtz | ......................... 257/417 |
| 5,770,806 A | * | 6/1998 | Hiismaki | .................. 73/861.29 |
| 5,939,639 A | * | 8/1999 | Lethbridge | .................... 73/724 |
| 6,070,469 A | * | 6/2000 | Taniguchi et al. | ............. 73/720 |
| 6,363,792 B1 | | 4/2002 | Kurtz | |
| 6,612,178 B1 | | 9/2003 | Kurtz et al. | |

* cited by examiner

*Primary Examiner*—Andre J Allen
(74) *Attorney, Agent, or Firm*—The Plevy Law Firm

(57) ABSTRACT

A pressure transducer for measuring pressures in high temperature environments employs a tube which is terminated at one end by an acoustic micro-filter. The acoustic filter or micro-filter has a plurality of apertures extending from one end to the other end, each aperture is of a small diameter as compared to the diameter of the transducer and the damper operates to absorb acoustic waves impinging on it with limited or no reflection. Mounted to the tube is a pressure transducer with a diaphragm flush with the inner wall of the tube. The tube is mounted in an aperture in a casing of a gas turbine operating at a high temperature. The hot gases propagate through the tube where the pressure of the gases are measured by the transducer coupled to the tube and where the acoustic filter operates to absorb acoustic waves impinging on it with little or no reflection, therefore enabling the pressure transducer to be mainly responsive to high frequency waves associated with the gas turbine operation.

20 Claims, 3 Drawing Sheets

PRESSURE TRANSDUCER EMPLOYING A MICRO-FILTER AND EMULATING AN INFINITE TUBE PRESSURE TRANSDUCER

FIELD OF THE INVENTION

This invention relates to pressure transducers and more particularly to a pressure transducer incorporating a micro-filter replacing the prior art infinite tube.

BACKGROUND OF THE INVENTION

Aerodynamic engineers have long desired to measure high frequency flow and pressure disturbances in gas turbine engines and aircraft wings. The capability was made possible with extremely compact pressure transducers fabricated from micro-machined silicon. The frequencies of concern were for example, in the tens of thousands of kilohertz (kHz). As such, Kulite Semiconductor Products, Inc., the assignee herein, has developed many transducers which operate to measure such pressure disturbances in gas turbine engines and aircraft wings. Such devices are the subject matter of various patents that describe their operation and fabrication. See, for example, U.S. Pat. No. 6,612,178 entitled "Leadless Metal Media Protected Pressure Sensor" issued on Sep. 2, 2003 to A. D. Kurtz et al. and assigned to the assignee herein. See also, U.S. Pat. No. 6,363,792 entitled "Ultra High Temperature Transducer Structure" issued on Apr. 2, 2002 to A. D. Kurtz et al. and assigned to the assignee herein. In any event, as will be explained, there are certain situations where mounting of the transducer becomes extremely difficult.

For example, in order to determine the pressure and high frequency flow in gas turbines, a recessed pipe is attached to the combustion chamber that allows the hot gasses within the chamber to cool before reaching the sensor. While the pipe does successfully cool the gases, it also reduces measurement of bandwidth because of the generation of harmonic frequencies. Similar to blowing air over an open bottle top, the air inside the recessed pipe will be compressed by the air jet back out of the recess. In essence, the air inside the bottle acts as a spring. The oscillations of the air inside the recess results in a resonant frequency similar to that of an organ pipe. Such vibrations make measuring the pressure and flow of the gases within the combustion chamber of the gas turbine difficult. As will be explained, in the prior art, a long, curled tube (or "infinite tube") of decreasing diameter has been used to remove such resonances. However, such a solution requires many feet of tubing and very accurate coiling of the tube. Further difficulties associated with the prior art include the lack of access for mounting such transducers in a turbine case, as well as problems which involve discriminating against low and high frequencies.

An alternative mechanism that overcomes one or more of these problems is desirable.

SUMMARY OF THE INVENTION

A micro-machined filter operates in conjunction with a transducer to absorb incoming acoustic waves and can be installed in close proximity to the transducer, thereby eliminating the long curled tube or the so called infinite tube.

A pressure transducer assembly for measuring pressure in high temperature environments comprises: a tube having a first opened end and a second opened end, a pressure transducer mounted on a surface of the tube and extending in to the tube opening to allow the transducer to measure a pressure applied to the tube via the first opened end, the pressure obtained from a pressure source to be monitored. A micro-filter mounted and positioned in the second opened end is operative to absorb incoming acoustic waves associated with the pressure source coupled to the front opened end and operative to apply a pressure thereto. The first opened end of said tube has a larger diameter which tapers to a smaller diameter front opening, the front towards the back opened end along a given tube length.

DETAILED DESCRIPTION OF THE INVENTION

Figure 1:
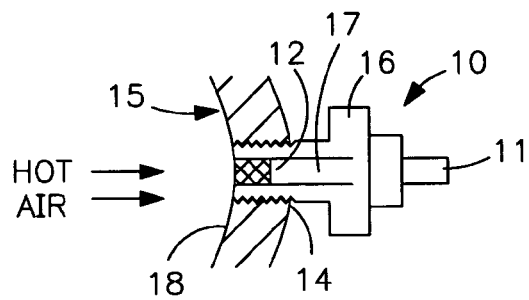
FIG. 1 depicts a prior art technique of mounting a pressure transducer to a turbine casing designated as a flush mount condition.

Referring to FIG. 1, there is shown a prior art technique depicting a typical installation which is employed in the aerodynamics industry. In FIG. 1, reference numeral 15 represents a gas turbine casing. The gas turbine casing is typically found in a gas turbine engine. The operation of such an engine is attendant with extremely high temperatures which are directed to the casings. There is shown a transducer 10 which is mounted on a housing 16. Housing 16 is threaded and essentially threads into a threaded aperture which is formed in the turbine casing 15. Located remote from the transducer 10 is a sensing diaphragm 12. The sensing diaphragm 12 as seen in FIG. 1 is responsive to the pressure created by the hot air gases associated with the turbine which therefore causes the diaphragm 12 to deflect and produces a pressure response from the transducer which is coupled thereto via the tube cavity 17. The cable 11 directs the output from the transducer 16 to various monitoring equipment as is well known. As indicated, FIG. 1 shows a typical installation with the transducer 10 installed on the gas turbine case 15. The close coupling of the transducer sensing diaphragm 12 which is flush mounted with the inner wall surface 18 of the turbine case gives a relatively good measurement frequency. The upper limit of the frequency being the sensor resonant frequency, is typically in the hundreths of KHz. The diaphragm 12 basically is flush with the inner wall 18 of the turbine casing. However, there are certain situations where the flush mount is not possible.

Figure 2:
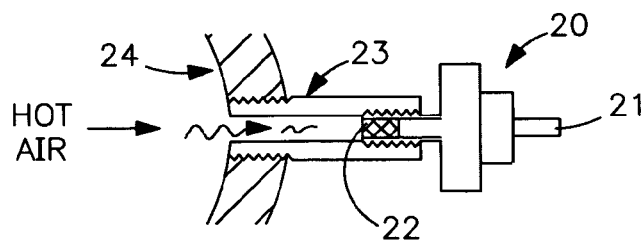
FIG. 2 depicts an alternate method of mounting a pressure transducer to a turbine casing using a elongated tube.

Referring to FIG. 2, there is shown a more typical installation where the transducer 20 must be recessed some distance away from the turbine case 24. The reasons for such a recess include lack of access, but most often this is due to the extremely high turbine gas temperature pressure compressor temperatures which can be as high as 2000° C. These temperatures require use of the elongated tube 23. In modern aircraft engines the compressor air temperature reaches about 700° C. and the combustor gas temperature can be as high as about 2000° C. The latter temperature is beyond the capabilities of even the most advanced piezoresistive transducers. Thus, the measurement of pressure at these high temperatures involves a recessed installation with the transducer and pressure source separated by a pipe or tube 23 so that the transducer is located in a somewhat cooler ambient area. As seen in FIG. 2, the pipe 23 extends from the gas turbine case 24 and now accommodates the transducer 20, the cable 21 and the diaphragm 22. The diaphragm 22 is remote from the casing 24 (as compared to FIG. 1). One example of transducer 20 is the high temperature miniature IS pressure transducer manufactured and sold by Kulite Semiconductor Products, Inc., as the XCEL-072 series. Such transducers are about 0.075 inches (0.075") in diameter. The pipe 23 while shown not to scale in FIG. 2, is essentially an organ pipe with a finite length. This reduces the measurement frequency due to organ pipe harmonic frequencies, defined as $f=c/4L$, where f is equal to the frequency, c is equal to the velocity of the hot air and L is the length of the pipe as for example pipe 23. As is known, the recess pipe reduces the measurement frequency based on pipe harmonic frequencies as defined by the above equation and high harmonics. For example, a one inch long organ pipe-filled with air has a resonant frequency of about 3.3 kHz representing an acoustic wave bouncing back and forth between the organ pipe ends. The usable frequency is even less, by about a factor of 5, to about 60 Hz, which is too low for most gas turbine applications. To overcome this limitation, a technique known as infinite tube pressure transducer solves the organ pipe frequency limitation.

Figure 3:
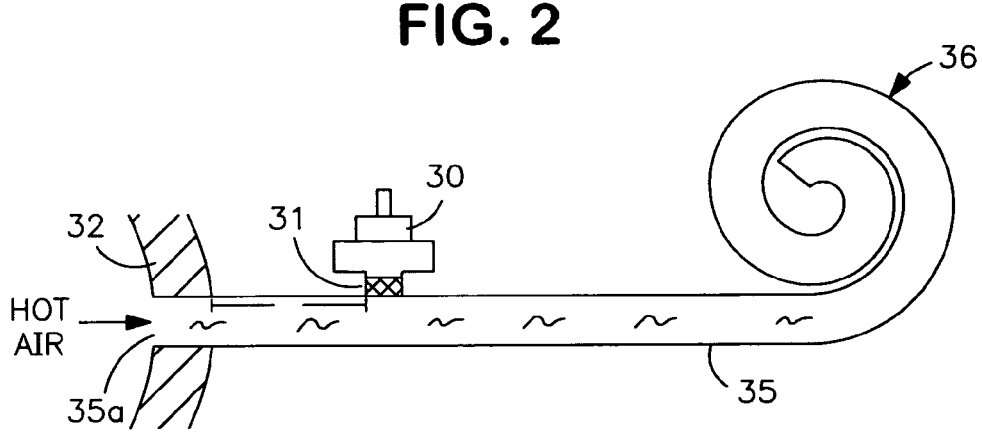
FIG. 3 depicts still another technique of mounting a pressure transducer to a turbine casing using a coiled tube or infinite tube array.

Referring to FIG. 3, a transducer 30 (as above) is installed on the side wall of the so called infinite tube 35. The transducer is installed some distance D away from the hot gas inlet, typically a distance of about one to six inches, with longer distances if the gas temperature is higher. The tube 35 is coupled to the gas turbine case 32 via an aperture. The hot air enters the tube at inlet 35a and the tube has an end which essentially is coiled as indicated by reference numeral 36. The acoustic waves as generated from the source, enter the tube 35 and travel to the transducer location with little or no attenuation. Because there is basically no reflection off the far end, the transducer measurement will not be contaminated with organ pipe harmonics and thus will measure static and dynamic pressure to higher frequencies than achievable in installations such as those depicted in FIG. 1 and FIG. 2. This arrangement allows the transducer to be positioned in a cooler location, therefore, allowing pressure measurements at very high gas temperatures. In situations where dynamic pressure at the transducer location is attenuated, calibration curves can be used to correct the measurement data. The infinite tube which typically can be 30 to 1000 feet long, is packaged into a cylindrical bundle as indicated by reference numeral 36 to the size of about 2 to 3 inches in diameter, and 3 to 5 inches long. As one can ascertain, this cylindrical bundle is rather large, compared for example, to the dimensions of the transducer 30 associated with the deflection diaphragm 31. For example, a typical IS transducer as indicated above, is about 0.375 inches in length and has a diameter of about 0.075 inches. Thus, as one can ascertain, the infinite tube package is quite large compared to the size of the transducer. The infinite tube package is also cumbersome to handle in practice. For example, slight kinks in the tube cause undesirable acoustic reflections. Therefore, great care must be taken in coiling the tube into a cylindrical bundle. It is thus preferable to use small diameter tubes for ease of packing and low weight. However, better performance results if the sensing diaphragm is as close to the tube's inner wall as possible, thus avoiding sharp edges and cavities. The edges and cavities are sources of acoustic reflection. For this reason, larger diameter tubes or tubes of oval cross section are more desirable so that small diameter (e.g., 0.075 inch) transducers can be used. Practically, the infinite tube diameter is a compromise between these two constraints, and is typically about 0.125 inches in diameter. Thus, even with optimum packaging, typical infinite tube transducers are size and weight limited. They are prone to damage by shock and vibration typically found in gas turbine test environments. It is well known that instrumentation engineers prefer not to use these transducers whenever an alternative method is available. Because of these limitations, the infinite tube transducer is used by few of the world's gas turbine manufacturers. For example, of the particular uses of infinite tubes, reference is made to two pending applications, entitled "Low-Pass Filter Semiconductor Structures for Use in Transducers for Measuring Low Dynamic Pressures in the Presence of High Static Pressures" by A. D. Kurtz et al. and assigned to the assignee herein, and "Improved Pressure Transducer for Measuring Low Dynamic Pressures in the Presence of High Static Pressures" also by A. D Kurtz and assigned to the assignee herein. The above-identified applications describe infinite tube transducers and essentially the characteristics and operation of such tubes in frequency responsive applications.

Figure 4:
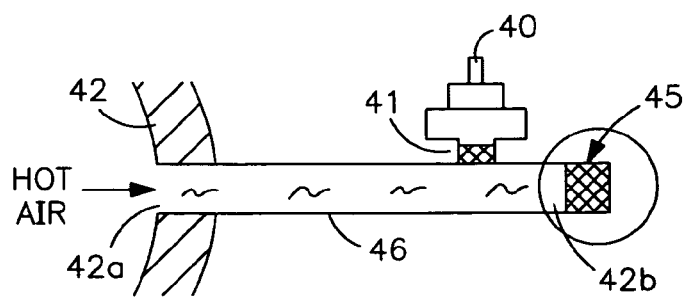
FIG. 4 depicts a pressure transducer mounted to a turbine casing employing the micro-damper according to an embodiment of the present invention.

Referring now to FIG. 4, there is shown schematically an apparatus according to an exemplary embodiment of the present invention which essentially eliminates the infinite tube bundle depicted in FIG. 3. According to an aspect of the present invention, a micro-filter 45 essentially mimics the effects and benefits associated with the infinite tube structure illustrated in FIG. 3. The micro-filter 45 operates to absorb acoustic waves impinging on it with limited or no reflection. One way of achieving a micro-filter is to use a wafer of silicon with micro-pores etched from the wafer. The micro-pores are small in diameter so as to maximize viscous damping effects. Because the acoustic waves are likely to bounce off solid surfaces, the micro-filter surface facing the flow should be as small as possible and of course include pores or apertures in the surface. As shown in FIG. 4, a tube 46 is coupled to the turbine casing and allows hot air to enter the front opening 42a. The transducer 40 is remotely located from the turbine casing and is placed on the surface of the tube 46 with the sensing diaphragm 41. Following and terminating the infinite tube at the back opening 42b is the micro-filter 45. The micro-filter replaces the very long tube as indicated in FIG. 3, achieving substantial size and weight reductions. A number of unanticipated benefits are derived from this construction.

Figure 5:
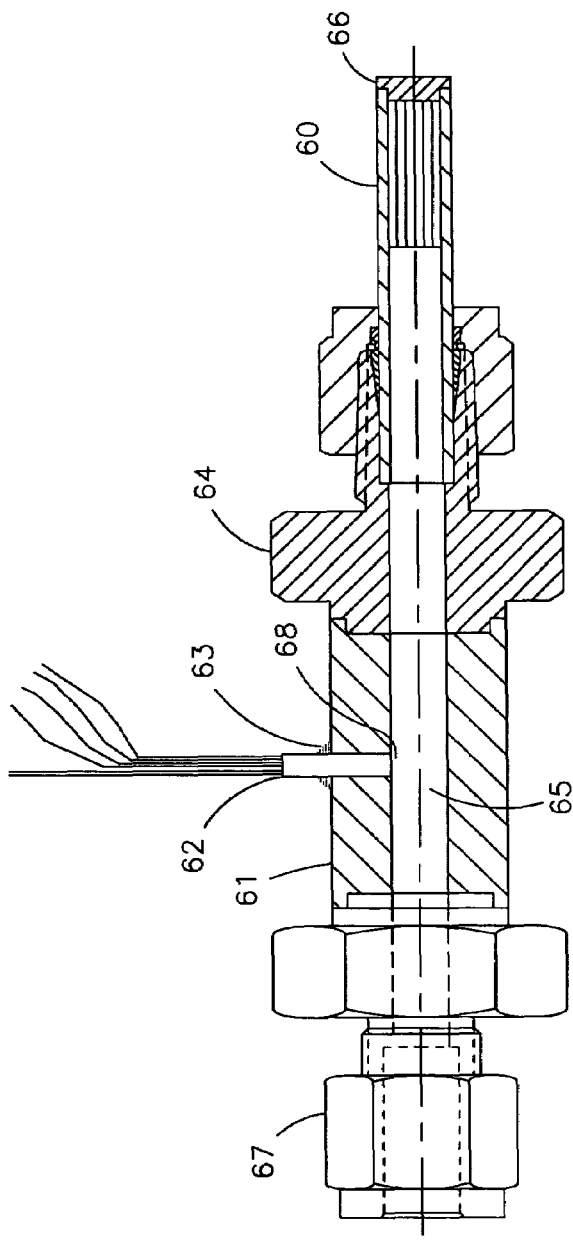
FIG. 5 shows a pressure transducer utilizing a micro-damper or filter according to an embodiment of the present invention.

Referring to FIG. 5, there is shown a cross-sectional view of a transducer assembly utilizing a micro-filter 60. The micro-filter 60 can be fabricated by a number of techniques, including, for example, use of a silicon wafer having suitable pores etched therein. The micro-filter or damper can be a compilation of micro-glass tubes each of about 0.5 inches in length. One can use an additional porous silicon wafer to increase damping. A single glass tube array or a single porous silicon wafer can alternatively be used. As one can see, the pressure transducer assembly has a housing 61, which housing contains the pressure transducer 62 with the diaphragm end of the transducer 68 located within the cavity 65 of the housing assembly 61. The cavity 65 extends from one opened end to the other opened end, where the other opened end is terminated with the micro-damper 60 and has an end cap 66. A mounting arrangement indicated generally as reference numeral 67 is shown for mounting the entire unit to a suitable structure, and includes fitting screws and/or other well know connectors. Such mounting arrangement is well known and further description is omitted herein for brevity.

Figure 7:
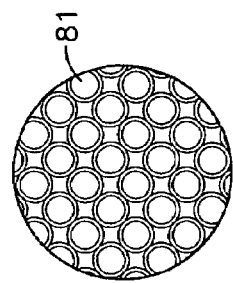
FIG. 7 shows an enlarged view of the array of pores or apertures in the micro-damper of FIG. 6.
Figure 6:
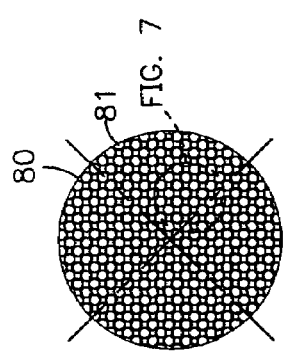
FIG. 6 shows a front view of a micro-damper according to an embodiment of the present invention.

Referring to FIG. 6, there is shown a cross-sectional view of the micro-filter or damper 60 depicted in FIG. 5. As one can ascertain there are a plurality of small apertures 81 which extend from one end of the damper 80 to the other end. FIG. 7 shows an enlarged view of the apertures in FIG. 6. As one will understand, the micro-filter 60 can be fabricated from silicon and one can etch apertures shown in FIG. 6 and FIG. 7 into the silicon by conventional etching techniques. The etching of silicon and formation of apertures in silicon is well known. The acoustic damper 60 is fabricated by the packing small diameter glass tubes which basically are stacked within an outer shell or housing depicted by reference numeral 80 of FIG. 6. The glass tubes can have an inner diameter of about 0.004 inches with an outer diameter of about 0.005 inches. The outer diameter can vary between about 0.005 inches and 0.02 inches with the inner diameter varying between about 0.004 inches and 0.015 inches. The tubes are about 0.5 inches in length. The variation of diameters is a function of the frequencies to be accommodated. Thus, the glass tube matrix array as shown in FIGS. 6 and 7 illustrate configuration(s) employed with the glass tubes abutting against one another. The glass tubes are conventionally joined together under heat and one then extrudes the bundle to produce the array. A wafer of silicon can be utilized with the apertures directed from a first to a second surface of the silicon, or both devices can be employed together. In any event, the present invention has many advantages which are not accommodated by the prior art techniques. For example, the size and weight of the unit, in contrast to the unit of FIG. 3, are greatly reduced by at least one order of magnitude. The device shown in FIG. 5 is easier to handle and less susceptive to shock and vibration damage and represents a more viable device for wide spread use in gas turbine testing or laboratory research. The device further extends the high frequency pressure measurement capability in extremely high temperature and high vibration environments. Still further, larger diameter coupling tubes can be used without significant size and weight boundaries because the very long infinite tube is eliminated and a compact micro-filter (as for example 60 depicted in FIG. 5) is employed. The pressure transducer 62, for example, having a 0.075 inch diameter housing as seen in FIG. 5, is flush mounted to the tube 65 inside wall with little or no step cavity. This is depicted in FIG. 5 wherein the diaphragm portion 68 of the transducer 62 is flush with the inner wall of the internal tube cavity 65. The larger diameter reduces viscous damping as pressure waves travel to the transducer along the tube. Both factors lead to better pressure measurements, in terms of both accuracy as well as frequency range. The pressure measurements using such a technique will include both static and dynamic pressure when a piezoresistive pressure transducer is employed for transducer 62. Also, as new high temperature piezoresistive transducers are developed, the distance between the transducer and the hot gases can be reduced, thus allowing pressure measurements to be made with better accuracy and higher frequency. While it is clear that the above noted damper operates at substantially reduced organ pipe resonance, the use of the glass tube embodiment as for example shown in FIG. 7 experiences certain problems. While the damper depicted in FIGS. 6 and 7 operates favorably, it has one particular problem, in that based on the large surface area between tubes, acoustic waves can be reflected by this configuration and hence, the reflected acoustic waves produce undesirable damping, which is not optimal for certain applications. The optimal result is to have a damper which has a zero impedance operating in an acoustic channel for replacement of the infinite tube pressure transducers. In the embodiment depicted in FIGS. 6 and 7, the acoustic wave will impinge on the flat surface that exists between the glass tubes. Thus, even if the cylindrical surface contains a large number of holes through which some of the sound waves can pass, the remaining flat surface which basically is provided by the area between the tubes operates as an acoustic reflecting surface.

Figure 8:
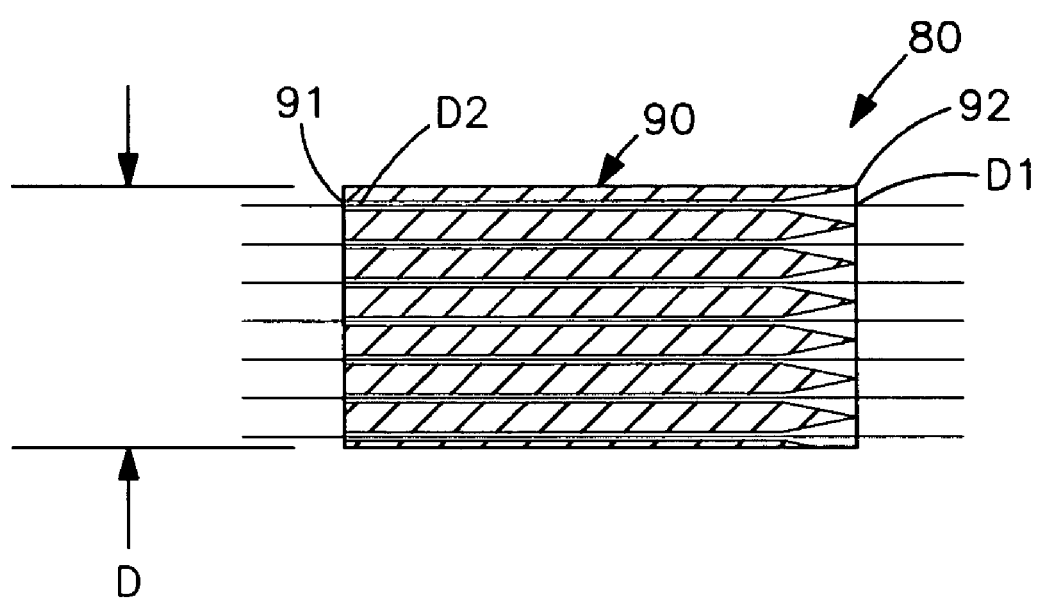
FIG. 8 shows a micro-damper having tapered apertures.

In FIG. 8 there is shown again a bundle of glass tubes which basically form a cylindrical member 80 which is approximately a quarter of an inch in diameter D and which contains approximately 20 to 40 through holes, each of which is about 10 mils in diameter. In regard to this configuration, one then utilizes a conically shaped diamond impregnated coring tool. This coring tool operates to enlarge each hole on the surface on which the acoustic wave will impinge. In one exemplary configuration depicted in FIG. 8, a conical tube has a diameter D1 of 0.100 inches tapering down to D2 0.025 inches over a length of 0.150 inches. Each hole is enlarged with the tube and essentially the resulting structure presents a zero acoustic impedance. With the input acoustic wave directed towards the conical openings 91 and 92, there is very little area for which the wave to be reflected. Hence, the wave is absorbed and enters each of the conical apertures 91 and 92 and travels down the respective tube 90 which operates to again damp. While the embodiment shown in FIGS. 6 and 7 operates, it does not operate as efficiently as the embodiment depicted in FIG. 8. The embodiment depicted in FIG. 8 eliminates resonances due to reflections off the front surface of the damper. For example, in regard to the damper shown in FIGS. 6 and 7 utilizing an overall cylindrical diameter of 0.25 inches and having 31 holes in the glass cylindrical member each hole having a diameter of 12 mils, this allows an open area equal to 7.14%. This open area is small and therefore there is a large amount of reflection from the front surface of the damper causing less than optimum performance. In regard to the configuration shown in FIG. 8 utilizing the same number of holes, the initial diameter due to the coring now is 38 mils and reduces to a diameter of 12 mils. This creates a conical hole entrance which basically results in a zero impedance structure. As there is very little surface area for which the acoustic wave to reflect from, the acoustic wave enters the conical apertures and is absorbed within the conical tube. It is noted that the conical apertures taper from a front opening towards the back during a predetermined portion of the tube. This taper can be changed or varied. In any event, as indicated above, the taper extends about 0.15 to 0.25 inches along the length of the tube. Each tube is typically 0.5 inches in length. It is of course understood that the length can vary as well as the diameter of the apertures can vary dependent upon the frequencies to be accommodated. While the use of micro-machined silicon can be employed as the micro-filter, other materials can be used, such as micro-machined glass or micro-machined silicon carbide. Thus, the acoustic damper can be employed and fabricated utilizing many different materials.

It will be apparent to those skilled in the art that modifications and variations may be made in the apparatus and process of the present invention without departing from the spirit or scope of the invention. It is intended that the present invention cover the modification and variations of this invention provided they come within the scope of the appended claims and their equivalents.

What is claimed is:

1. A pressure transducer assembly for measuring pressure in high temperature environments, comprising:

a tube having a first opened end and a second opened end, a pressure transducer mounted on a surface of said tube and extending in to the tube opening to allow said transducer to measure a pressure applied to said tube via said first opened end, said pressure obtained from a pressure source to be monitored, and a micro-filter mounted and positioned in said second opened end and operative to absorb incoming acoustic waves associated with said pressure source applied to said first opened end.

2. The pressure transducer assembly according to claim 1, wherein said pressure source includes hot gases emanating from a gas turbine engine.

3. The pressure transducer assembly according to claim 2, wherein said front opened end of said tube is mounted within an aperture of a gas turbine engine casing.

4. The pressure transducer assembly according to claim 1, wherein said micro-filter has a plurality of apertures extending from a front surface to a back surface, with said filter positioned and mounted in said second opened end of said tube with said front surface surrounded by said tube wall, wherein pressure waves in said tube are directed to said apertures and travel from said front to back surface of said filter where they are absorbed.

5. The pressure transducer assembly according to claim 4, wherein said apertures have a tapered opening at said front end with said opening at said front end having a larger diameter which tapers into a smaller diameter along a given length of said aperture.

6. The pressure transducer assembly according to claim 5, wherein said front opening of said apertures are conical in cross section.

7. The pressure transducer assembly according to claim 4, wherein said micro-filter is fabricated from glass tubes with said apertures formed by assembling glass tubes of a given diameter in to a cylindrical array.

8. The pressure transducer assembly according to claim 7, wherein said glass tubes have a tapered front opening with a larger diameter at the front which tapers into a smaller diameter.

9. The pressure transducer assembly according to claim 7, wherein said glass tubes prior to forming said filter have an outer diameter between 0.005 inches to 0.020 inches and an inner diameter between 0.004 and 0.015 inches, depending on the frequency of the acoustic waves to be absorbed.

10. The pressure transducer assembly according to claim 1, wherein the temperature of operation is greater than 700° C.

11. A micro-filter for use in conjunction with a pressure transducer, said pressure transducer having a diaphragm mounted flush with an inner wall of a pressure conducting tube, said tube having a front opened end for receiving a pressure and a back opened end, said filter in combination therewith, comprising:

a cylindrical member having a front surface and a back surface, a plurality of apertures of a given diameter found in said member and directed from said front to said back surface and having a diameter and length selected to absorb lower frequency acoustic waves associated with said received pressure, said member adapted to be mounted at said back opened end of said tube with said apertures aligned parallel to the axis of said pressure conducting tube.

12. The micro-filter according to claim 11, wherein said cylindrical member is fabricated from a plurality of glass tubes each having said given diameter and arrayed in a bundle to form said member.

13. The micro-filter according to claim 12, wherein said glass tubes have a larger diameter front opening which tapers along a partial length of said tube to a smaller diameter.

14. The micro-filter according to claim 13, wherein said glass tube tapers are conical in cross section.

15. The micro-filter according to claim 13, wherein said glass tubes are tapered using a conically shaped coring tool.

16. The micro-filter according to claim 11, wherein said opened front end of said tube is coupled to the inner wall of a gas turbine casing.

17. The micro-filter according to claim 11, wherein said pressure transducer is a piezoresistive pressure transducer.

18. The micro-filter according to claim 1, wherein said apertures have an inner diameter between 0.004 and 0.015 inches.

19. The micro-filter according to claim 12, wherein said glass tubes have an outer diameter between 0.005 to 0.020 inches and an inner diameter between 0.004 and 0.015 inches.

20. The micro-filter according to claim 11, wherein the temperature of operation is greater than 700° C.

* * * * *